US012119016B2

(12) United States Patent
Rule et al.

(10) Patent No.: US 12,119,016 B2
(45) Date of Patent: Oct. 15, 2024

(54) COMPRESSIVE HEAR-THROUGH IN PERSONAL ACOUSTIC DEVICES

(71) Applicant: Bose Corporation, Framingham, MA (US)

(72) Inventors: John Allen Rule, Berlin, MA (US); Daniel M. Gauger, Jr., Berlin, MA (US); Dale McElhone, Marlborough, MA (US); Katie Janine Moenkhaus, Watertown, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 17/381,794

(22) Filed: Jul. 21, 2021

(65) Prior Publication Data

US 2021/0350816 A1 Nov. 11, 2021

Related U.S. Application Data

(62) Division of application No. 16/124,056, filed on Sep. 6, 2018, now Pat. No. 11,087,776.

(Continued)

(51) Int. Cl.
*G10K 11/178* (2006.01)
*G10L 21/0232* (2013.01)
(Continued)

(52) U.S. Cl.
CPC .... *G10L 21/0232* (2013.01); *G10K 11/17823* (2018.01); *G10K 11/17833* (2018.01);
(Continued)

(58) Field of Classification Search
CPC ....... G10K 11/17835; G10K 11/17837; G10K 11/17833; G10K 11/17823;
(Continued)

(56) References Cited

U.S. PATENT DOCUMENTS 6,456,199 B1 * 9/2002 Michael .................. G01H 3/14
340/573.1
8,073,150 B2 12/2011 Joho et al.
(Continued)

FOREIGN PATENT DOCUMENTS

CN 101388652 3/2009
CN 105052170 11/2015
(Continued)

OTHER PUBLICATIONS

U.S. Appl. No. 15/710,354, filed Sep. 20, 2017, Meulen et al.
(Continued)

*Primary Examiner* — Disler Paul
(74) *Attorney, Agent, or Firm* — Fish & Richardson P.C.

(57) ABSTRACT

The technology described in this document can be embodied in a method that includes receiving an input signal representing audio captured by a microphone of an active noise reduction (ANR) headphone, processing, by one or more processing devices, a portion of the input signal to determine a noise level in the input signal, and determining that the noise level satisfies a threshold condition. The method also includes, in response to determining that the noise level satisfies the threshold condition, generating an output signal in which ANR processing on the input signal is controlled in accordance with a target loudness level of the output signal, and driving an acoustic transducer of the ANR headphone using the output signal.

22 Claims, 11 Drawing Sheets

Related U.S. Application Data

(60) Provisional application No. 62/578,827, filed on Oct. 30, 2017.

(51) Int. Cl.

| | |
|---|---|
| ***G10L 25/84*** | (2013.01) |
| ***H04R 1/10*** | (2006.01) |
| ***H04R 3/00*** | (2006.01) |
| ***H04R 5/033*** | (2006.01) |
| ***H04R 5/04*** | (2006.01) |
| *G10L 25/78* | (2013.01) |

(52) U.S. Cl.
CPC .. *G10K 11/17835* (2018.01); *G10K 11/17837* (2018.01); *G10K 11/17885* (2018.01); *G10L 25/84* (2013.01); *H04R 1/1083* (2013.01); *H04R 3/00* (2013.01); *H04R 5/033* (2013.01); *H04R 5/04* (2013.01); *G10K 11/17827* (2018.01); *G10K 2210/1081* (2013.01); *G10K 2210/3014* (2013.01); *G10K 2210/3016* (2013.01); *G10K 2210/3039* (2013.01); *G10K 2210/3056* (2013.01); *G10L 25/78* (2013.01); *H04R 2430/01* (2013.01); *H04R 2460/01* (2013.01)

(58) Field of Classification Search
CPC ....... G10K 11/17885; G10K 11/17827; G10K 2210/1081; G10K 2210/3221; G10K 2210/3056; G10K 2210/3039; G10K 2210/3016
USPC ......................................... 381/71.1, 71.6, 74
See application file for complete search history.

(56) References Cited

U.S. PATENT DOCUMENTS

| | | | | |
|---|---|---|---|---|
| 8,073,151 | B2 | 12/2011 | Joho et al. | |
| 8,155,334 | B2 | 4/2012 | Joho et al. | |
| 8,532,307 | B2 * | 9/2013 | Derleth | H04R 25/552 381/313 |
| 8,798,283 | B2 | 8/2014 | Gauger, Jr. et al. | |
| 9,082,388 | B2 | 7/2015 | Annunziato et al. | |
| 9,578,415 | B1 | 2/2017 | Zhou et al. | |
| 9,704,472 | B2 * | 7/2017 | Kwatra | G10K 11/17885 |
| 9,706,296 | B2 * | 7/2017 | Uhle | G10K 11/17837 |
| 9,767,786 | B2 * | 9/2017 | Starobin | G10K 11/17875 |
| 9,854,349 | B2 | 12/2017 | Murata et al. | |
| 9,984,673 | B2 * | 5/2018 | Jung | G10K 11/17881 |
| 10,299,047 | B2 | 5/2019 | Meyer et al. | |
| 10,425,745 | B1 * | 9/2019 | Merks | H04R 25/407 |
| 10,755,690 | B2 * | 8/2020 | Mohammad | H04R 1/1083 |
| 11,087,776 | B2 | 8/2021 | Rule et al. | |
| 2006/0098827 | A1 * | 5/2006 | Paddock | H03G 9/005 381/106 |
| 2006/0153394 | A1 | 7/2006 | Beasley | |
| 2010/0310086 | A1 | 12/2010 | Magrath et al. | |
| 2011/0007907 | A1 | 1/2011 | Park et al. | |
| 2012/0316872 | A1 | 12/2012 | Stoltz et al. | |
| 2014/0126733 | A1 | 5/2014 | Gauger, Jr. et al. | |
| 2014/0126756 | A1 | 5/2014 | Gauger | |
| 2014/0363010 | A1 | 12/2014 | Christopher et al. | |
| 2015/0071453 | A1 | 3/2015 | Po et al. | |
| 2015/0104031 | A1 | 4/2015 | Park et al. | |
| 2015/0190284 | A1 | 7/2015 | Di Censo et al. | |
| 2015/0264469 | A1 | 9/2015 | Murata et al. | |
| 2016/0005389 | A1 | 1/2016 | Nooralahiyan et al. | |
| 2017/0200442 | A1 | 7/2017 | Yamabe et al. | |
| 2018/0012585 | A1 | 1/2018 | Qiao | |
| 2019/0130928 | A1 | 5/2019 | Rule et al. | |
| 2020/0184944 | A1 | 6/2020 | Dahl et al. | |
| 2020/0202839 | A1 | 6/2020 | Asada et al. | |

FOREIGN PATENT DOCUMENTS

| | | | | |
|---|---|---|---|---|
| CN | 105393301 | | 3/2016 | |
| CN | 106601225 | | 4/2017 | |
| CN | 106792305 | | 5/2017 | |
| CN | 106911980 | | 6/2017 | |
| CN | 107439018 | A * | 12/2017 | G10L 21/0272 |
| EP | 2225754 | | 9/2010 | |
| WO | WO 2009/081185 | | 7/2009 | |
| WO | WO 2014/070995 | | 5/2014 | |
| WO | WO 2017/066709 | | 4/2017 | |

OTHER PUBLICATIONS

International Search Report and Written Opinion in International Appln. No. PCT/US2018/058201, dated Feb. 18, 2019, 25 pages.

International Preliminary Report on Patentability in International Appln. No. PCT/US2018/058201, dated May 5, 2020, 12 pages.

Office Action in Chinese Appln. No. 2018800709936, mailed on Sep. 13, 2023, 24 pages (with Machine Translation).

* cited by examiner

COMPRESSIVE HEAR-THROUGH IN PERSONAL ACOUSTIC DEVICES

CROSS REFERENCE TO RELATED APPLICATION

This application is a divisional of U.S. patent application Ser. No. 16/124,056, filed on Sep. 6, 2018, which claims the benefit of U.S. Provisional Application 62/578,827, filed on Oct. 30, 2017, the entire content of which is incorporated herein by reference.

TECHNICAL FIELD

This disclosure generally relates to active noise reduction (ANR) devices that also allow hear-through functionality to reduce isolation effects.

BACKGROUND

Acoustic devices such as headphones can include active noise reduction (ANR) capabilities that block at least portions of ambient noise from reaching the ear of a user. Therefore, ANR devices create an acoustic isolation effect, which isolates the user, at least in part, from the environment. To mitigate the effect of such isolation, some acoustic devices can include a hear-through mode, in which the noise reduction is turned down for a period of time and the ambient sounds are allowed to be passed to the user's ears. Examples of such acoustic devices can be found in U.S. Pat. Nos. 8,155,334 and 8,798,283, the entire contents of which are incorporated herein by reference.

SUMMARY

In one aspect, this document describes a method that includes receiving an input signal representing audio captured by a microphone of an active noise reduction (ANR) headphone, processing, by one or more processing devices, a portion of the input signal to determine a noise level in the input signal, and determining that the noise level satisfies a threshold condition. The method also includes, in response to determining that the noise level satisfies the threshold condition, generating an output signal in which ANR processing on the input signal is controlled in accordance with a target loudness level of the output signal, and driving an acoustic transducer of the ANR headphone using the output signal.

In another aspect, this document features an apparatus that includes a noise reduction headphone, a controller, and an acoustic transducer. The noise reduction headphone is configured to generate an input signal based on captured ambient sounds. The controller includes one or more processing devices, and is configured to process a portion of the input signal to determine a noise level in the input signal. The controller is also configured to determine that the noise level satisfies a threshold condition, and, responsive to determining that the noise level satisfies the threshold condition, generate an output signal in which noise reduction processing on the input signal is controlled in accordance with a target loudness level of the output signal. The acoustic transducer is configured to generate an acoustic output in accordance with the output signal.

In another aspect, this document features one or more machine-readable storage devices having encoded thereon computer readable instructions for causing one or more processing devices to perform various operations. The operations include receiving an input signal representing audio captured by a microphone of an active noise reduction (ANR) headphone, processing a portion of the input signal to determine a noise level in the input signal, and determining that the noise level satisfies a threshold condition. The operations also include, responsive to determining that the noise level satisfies the threshold condition, generating an output signal in which ANR processing on the input signal is controlled in accordance with a target loudness level of the output signal, and driving an acoustic transducer of the ANR headphone using the output signal.

Implementations of the above aspects can include one or more of the following features.

The threshold condition can be determined based on a user-input, for example, based on a target loudness level indicated by the user-input. Determining that the noise level satisfies the threshold condition can include determining that the noise level is larger than a level associated with the threshold condition, and in response, controlling the ANR processing in accordance with the noise level. Determining that the noise level satisfies the threshold condition can also include determining that the noise level is less than a level associated with the threshold condition, and in response, controlling the ANR processing independently of the noise level. Generating the output signal can include processing the input signal in a first signal path that includes one or more ANR filters to generate a first signal, processing the input signal in a second signal path, disposed in parallel to the first signal path, to generate a second signal, and generating the output signal by combining the first signal and the second signal in a weighted combination. The first and second signal paths can each include a variable gain amplifier (VGA).

In a first mode of operation of the ANR headphone, a weight associated with the first signal can be substantially equal to zero. In a second mode of operation of the ANR headphone, a weight associated with the second signal can be substantially equal to zero. Each of the first signal path and the second signal path can be disposed in a feedforward signal path disposed between a feedforward microphone and the acoustic transducer. The portion of the input signal processed to determine the noise level can be limited to a range of frequencies. The noise level in the input signal can be determined as a signal-to-noise ratio (SNR) with respect to another signal also driving the acoustic transducer. The output signal can be generated in accordance with a response rate associated with the ANR processing. The response rate can be determined based on a user-input. The threshold condition can be selected from multiple threshold conditions each of which corresponds to a different degree of ANR processing. Controlling the degree of ANR processing on the input signal can include adjusting an insertion gain in accordance with the threshold condition. Controlling the degree of ANR processing on the input signal can include adjusting a compression of the input signal in accordance with the threshold condition.

In another aspect, this document features a method that includes receiving, at one or more processing devices, a first noise-level estimate, the first noise-level estimate being based on a first input signal captured by a first microphone disposed at a first earbud or earcup of an active noise reduction (ANR) headphone. The method also includes receiving, at the one or more processing devices, a second noise-level estimate, the second noise-level estimate being based on a second input signal captured by a second microphone disposed at a second earbud or earcup of the ANR headphone. The method further includes estimating an ambient noise level based on the first noise-level estimate and the second noise-level estimate, determining that the estimated ambient noise level satisfies a threshold condition, and in response, generating, for an ANR signal flow path disposed in each of the first and second earbud or earcup, a gain adjustment signal in accordance with the estimated ambient noise level, such that acoustic outputs from the first and second earbuds or earcups are controlled by the gain adjustment signal.

In another aspect, this document features an apparatus that includes a noise reduction headphone, and a controller comprising one or more processing devices. The noise reduction headphone includes a first earbud or earcup, and a second earbud or earcup. The controller is configured to receive a first noise-level estimate and a second noise-level estimate. The first noise-level estimate is based on a first input signal captured by a first microphone disposed at the first earbud or earcup, and the second noise-level estimate is based on a second input signal captured by a second microphone disposed at a second earbud or earcup. The controller is also configured to estimate an ambient noise level based on the first noise-level estimate and the second noise-level estimate, determine that the estimated ambient noise level satisfies a threshold condition, and in response, generate for an ANR signal flow path disposed in each of the first and second earbud or earcup, a gain adjustment signal in accordance with the estimated ambient noise level. Acoustic outputs from the first and second earbuds or earcups are controlled by the gain adjustment signal. The apparatus also includes an acoustic transducer in each of the first and second earbud or earcup, wherein the acoustic transducer is configured to generate an acoustic output in accordance with the output signal.

In another aspect, this document features one or more machine-readable storage devices having encoded thereon computer readable instructions for causing one or more processing devices to perform various operations. The operations include receiving a first noise-level estimate, the first noise-level estimate being based on a first input signal captured by a first microphone disposed at a first earbud or earcup of an active noise reduction (ANR) headphone. The operations also include receiving a second noise-level estimate, the second noise-level estimate being based on a second input signal captured by a second microphone disposed at a second earbud or earcup of the ANR headphone. The operations further include estimating an ambient noise level based on the first noise-level estimate and the second noise-level estimate, determining that the estimated ambient noise level satisfies a threshold condition, and in response, generating, for an ANR signal flow path disposed in each of the first and second earbud or earcup, a gain adjustment signal in accordance with the estimated ambient noise level, such that acoustic outputs from the first and second earbuds or earcups are controlled by the gain adjustment signal.

Implementations of the above aspects can include one or more of the following features.

The threshold condition can be determined based on a user-input. A gain level of the acoustic output from the first earbud or earcup can be substantially equal to a gain level of the acoustic output from the second earbud or earcup. Estimating the ambient noise level based on the first noise-level estimate and the second noise-level estimate can include determining an average of the first noise-level estimate and the second noise-level estimate. Each of the first and second noise-level estimates can be generated by processing the input signal captured by the corresponding microphone by an A-weighting filter. The gain adjustment signal can be configured to control a variable gain amplifier (VGA) disposed in the corresponding ANR signal flow path. The ANR signal flow path can include a first signal path that includes the VGA, and a second signal path disposed in parallel to the first signal flow path. The ANR signal flow path can be disposed in a feedforward signal path disposed between a feedforward microphone and an acoustic transducer of the corresponding earbud or earcup. The threshold condition can be selected from multiple threshold conditions, each of which corresponds to a different degree of ANR processing. The acoustic output of each of the first earbud or earcup can be generated in accordance with a compression process executed on the corresponding input signal.

Various implementations described herein may provide one or more of the following advantages. Providing a variable gain hear-through or pass-through signal flow path in parallel to an ANR signal flow path allows for implementing noise reduction functionalities while, in some instances, concurrently allowing ambient sounds to pass through to a degree as per user-preference. For example, the technology described herein can be used to implement a device that allows a user to be aware of the environment, but provides noise reduction functionalities when the ambient noise exceeds a threshold condition. In some cases, the threshold conditions can be controlled based on user-input—either as discrete steps, or substantially continuous over a range—to allow for a degree of control over the amount of ANR processing performed by the device. In some cases, the nature of ANR processing may also be varied in different ways in accordance with the threshold conditions. For example, parameters such as an insertion gain and/or a compression factor associated with the ANR processing may be adjusted in accordance with a threshold condition. In some cases, this may improve the user-experience associated with corresponding acoustic devices (e.g., headphones) by making such devices more usable in various different types of environments.

Two or more of the features described in this disclosure, including those described in this summary section, may be combined to form implementations not specifically described herein. The details of one or more implementations are set forth in the accompanying drawings and the description below. Other features, objects, and advantages will be apparent from the description and drawings, and from the claims.

DETAILED DESCRIPTION

Figure 1:
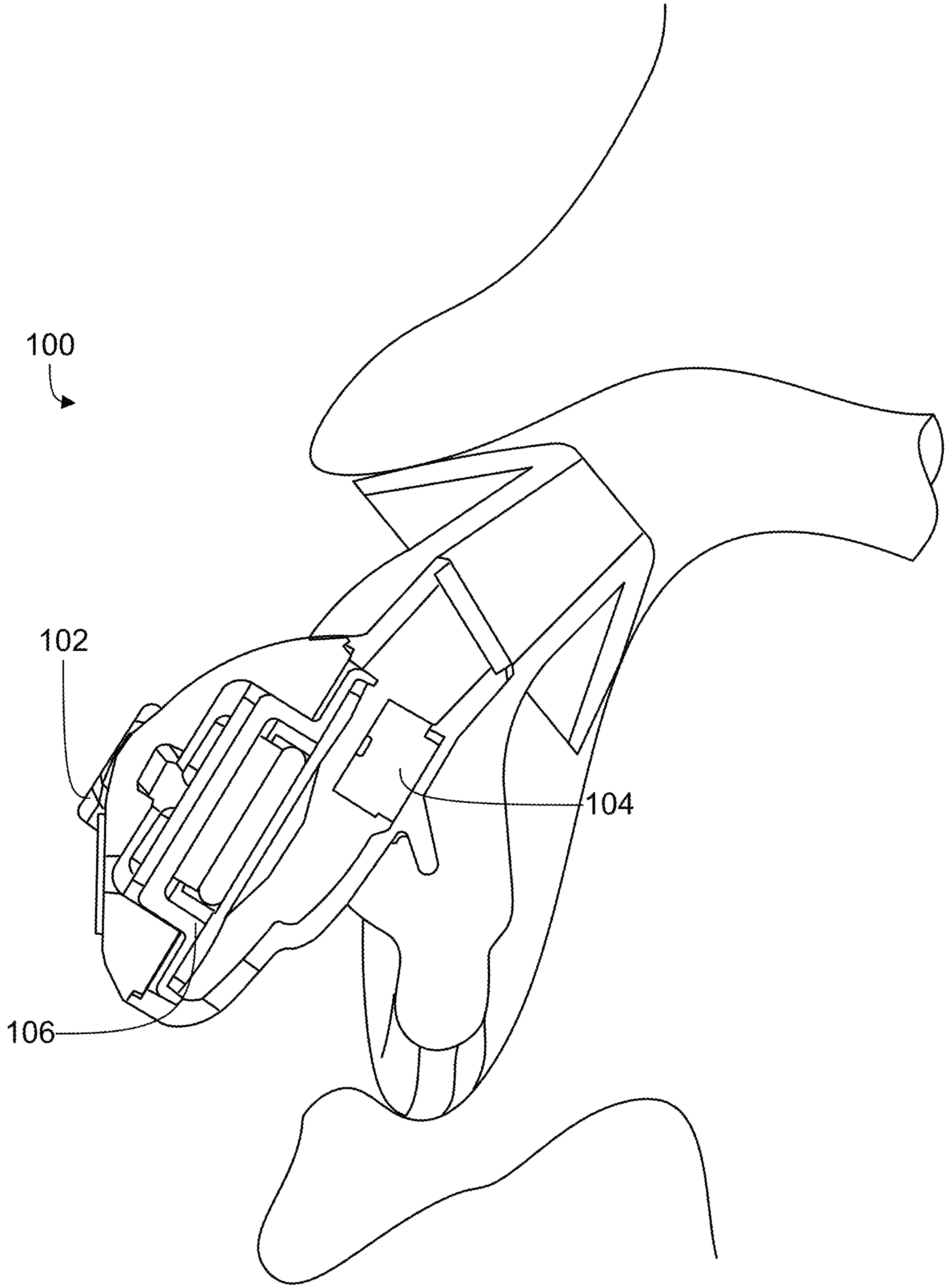
FIG. 1 shows an example of an in-the-ear active noise reduction (ANR) headphone.

This document describes technology that allows the use of Active Noise Reduction (ANR) in acoustic devices while concurrently allowing a user to be aware of ambient sounds up to a threshold amount. Active Noise Reduction (ANR) devices such as ANR headphones are used for providing potentially immersive listening experiences by reducing effects of ambient noise and sounds. However, by blocking out the effect of the ambient noise, an ANR device may create an acoustic isolation from the environment, which may not be desirable in some conditions. For example, a user waiting at an airport may want to be aware of flight announcements while using ANR headphones. In another example, while using an ANR headphone to cancel out the noise of an airplane in flight, a user may wish to be able to communicate with a flight attendant without having to take off the headphone.

Some headphones offer a feature commonly called "talk-through" or "monitor," in which external microphones are used to detect external sounds that the user might want to hear. For example, the external microphones, upon detecting sounds in the voice-band or some other frequency band of interest, can allow signals in the corresponding frequency bands to be piped through the headphones. Some other headphones allow multi-mode operations, wherein in a "hear-through" mode, the ANR functionality may be switched off or at least reduced, over at least a range of frequencies, to allow relatively wide-band ambient sounds to reach the user. However, in some cases, a user may want to be aware of ambient sounds up to a threshold, and want ANR processing to kick in only when the ambient sound exceeds the threshold. In addition, the user may want to have a degree of control on the amount of ambient sounds that pass through the ANR device.

The technology described herein allows for the implementation of an ANR signal flow path in parallel with a variable hear-through or pass-through signal flow path, wherein the gain of the pass-through signal path is controllable or adjustable based on threshold conditions on ambient noise. For example, a device implementing the technology can be configured to pass ambient sounds up to a threshold level (possibly with some ANR processing in parallel), but enable or ramp up the ANR processing when the magnitude of the ambient sound exceeds the threshold. In some cases, this may improve the overall user experience, for example, by helping a user avoid excessive acoustic isolation in low noise environments, while still providing ANR functionalities when the noise exceeds a threshold. In addition, various parameters of the ANR processing may be made adjustable based on the threshold. For example, parameters such as insertion gain or compression ratio can be made adjustable based on the threshold conditions to provide, for example, a target loudness level for the audio signal generated by the ANR headphone. Therefore, by facilitating a variable amount of hear-through and/or noise cancellation, the technology described herein enables more versatile ANR headphones that may be more usable in various types of environments.

An active noise reduction (ANR) device can include a configurable digital signal processor (DSP), which can be used for implementing various signal flow topologies and filter configurations. Examples of such DSPs are described in U.S. Pat. Nos. 8,073,150 and 8,073,151, which are incorporated herein by reference in their entirety. U.S. Pat. No. 9,082,388, also incorporated herein by reference in its entirety, describes an acoustic implementation of an in-ear active noise reducing (ANR) headphone, as shown in FIG. 1. This headphone 100 includes a feedforward microphone 102, a feedback microphone 104, an output transducer 106 (which may also be referred to as an electroacoustic transducer or acoustic transducer), and a noise reduction circuit (not shown) coupled to both microphones and the output transducer to provide anti-noise signals to the output transducer based on the signals detected at both microphones. An additional input (not shown in FIG. 1) to the circuit provides additional audio signals, such as music or communication signals, for playback over the output transducer 106 independently of the noise reduction signals. The additional input may be a wired or wireless (e.g., Bluetooth®) connection to an audio source.

The term headphone, which is interchangeably used herein with the term headset, includes various types of personal acoustic devices such as in-ear, around-ear or over-the-ear headsets, earphones, and hearing aids. The headsets or headphones can include an earbud or ear cup for each ear. The earbuds or ear cups may be physically tethered to each other, for example, by a cord, an over-the-head bridge or headband, or a behind-the-head retaining structure. In some implementations, the earbuds or ear cups of a headphone may be connected to one another via a wireless link.

Figure 2:
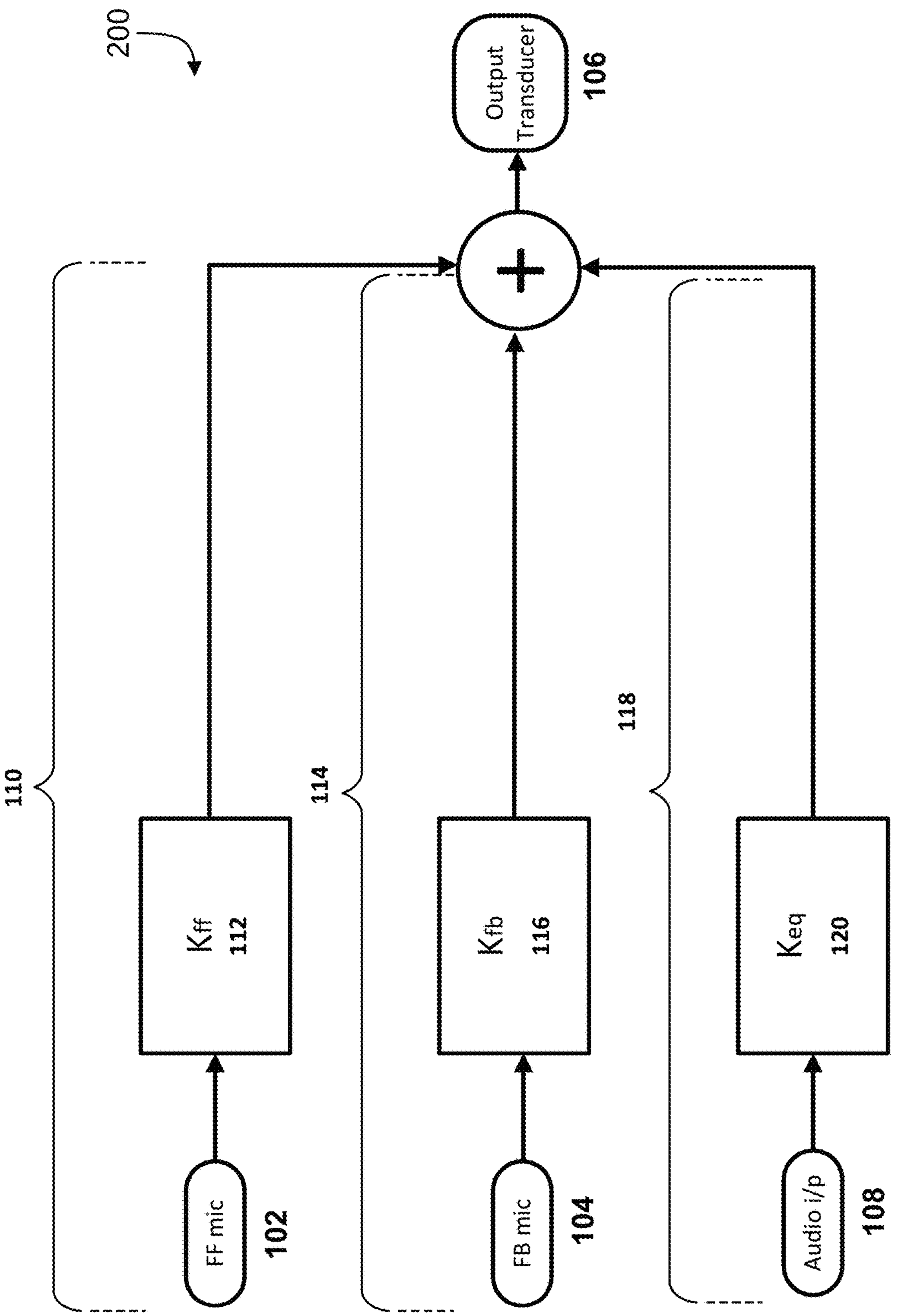
FIG. 2 is a block diagram of an example configuration in of an ANR device.

Various signal flow topologies can be implemented in an ANR device to enable functionalities such as audio equalization, feedback noise cancellation, feedforward noise cancellation, etc. For example, as shown in the example block diagram of an ANR device 200 in FIG. 2, the signal flow topologies can include a feedforward signal flow path 110 that drives the output transducer 106 to generate an anti-noise signal (using, for example, a feedforward compensator 112) to reduce the effects of a noise signal picked up by the feedforward microphone 102. In another example, the signal flow topologies can include a feedback signal flow path 114 that drives the output transducer 106 to generate an anti-noise signal (using, for example, a feedback compensator 116) to reduce the effects of a noise signal picked up by the feedback microphone 104. The signal flow topologies can also include an audio path 118 that includes circuitry (e.g., equalizer 120) for processing input audio signals 108 such as music or communication signals, for playback over the output transducer 106. In some implementations, the feedforward compensator 112 can include an ANR signal flow path disposed in parallel with a pass-through path. Examples of such configurations are described in U.S. patent application Ser. No. 15/710,354, filed on Sep. 20, 2017, the entire content of which is incorporated herein by reference.

In some implementations, the output of the output transducer 106 may be adjusted in accordance with a desired final volume or loudness at the ear, such that the amount of overall attenuation (e.g., obtained by controlling one or both of the ANR and pass-through signal paths) provided by the ANR device rises and falls as the surrounding noise level rises and falls, respectively. For example, when the ambient sound level does not satisfy a threshold condition (e.g., is below a threshold level), the ambient sound may be allowed to pass through to the ear with little or no attenuation. On the other hand, when the ambient sound level does satisfy the threshold condition (e.g., breaches the threshold level), the ambient sound may be attenuated, possibly progressively (i.e., with more attenuation as the environment gets louder).

Figure 3A:
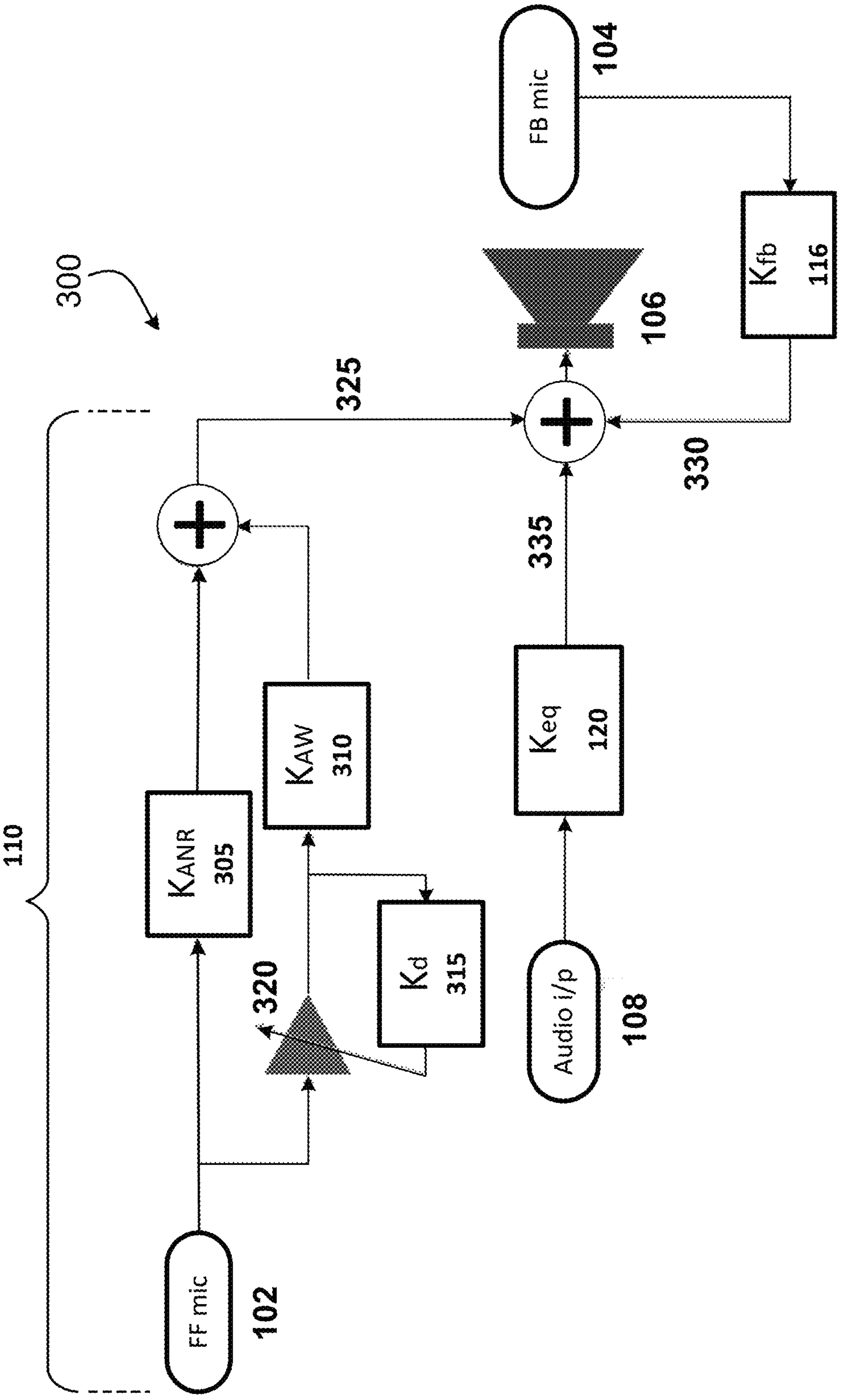
FIG. 3A is a block diagram of an example implementation of an ANR device where a variable pass-through path is disposed in parallel to an ANR path in a feedforward signal flow path.

FIG. 3A is a block diagram of an example implementation of an ANR device 300 where a variable pass-through path is disposed in parallel to an ANR path in a feedforward signal flow path to provide the variable attenuation described above. Specifically, the device 300 includes an ANR filter 305 (also denoted as $K_{ANR}$) disposed in parallel to a combination of a pass-through filter 310 (also denoted as $K_{AW}$) and a detector filter 315 (also denoted and referred to as a sidechain filter $K_d$). The detector filter 315 may be used to monitor signals captured using the FF microphone 102, and control an input to the pass-through filter (e.g., using a variable gain amplifier (VGA) or compressor 320). In some implementations, the input to the detector filter 315 can be pre-processed, for example, to make the detector filter 315 more sensitive to certain types of signal. For example, the sidechain filter can be configured to make the detector filter more sensitive to perceptually-weighted speech-band noise level changes. The output of the detector filter 315 can be used to adjust the VGA 320 which applies a gain to the input signal provided to the pass-through filter 310.

In some implementations, the detector filter 315 can include a frequency weighting filter (e.g., an A-weighting filter and/or a filter representing a head-related transfer function (HRTF)). The detector filter 315 can also include a level generator that converts the output of the frequency-weighting filter to a signal level, which is then compared to a threshold level (e.g., a user-defined or predetermined level). The detector filter 315 can also include a signal generator configured to generate a control signal that controls the gain of the VGA 320. In some implementations, the signal generator can be configured to generate the control signal in accordance with target attack and decay rate dynamics. An 'attack rate' is defined as the rate at which attenuation is increased. In some implementations, the target attack rate is less than 100 dB (in overall insertion gain) per second, such as approximately 10 dB/sec. A 'decay rate' or 'release rate' is defined as the rate at which attenuation is decreased. In some implementations, the decay rate is faster than the attack rate by a factor of two or more. In some implementations, a combination of a low threshold (e.g. <80 dBA of insertion gain) and a low attack rate (e.g., <100 dB/sec) can be used for a comfortable user experience in various scenarios of day-to-day life.

In some implementations, the detector filter 315 can be configured to control the VGA or compressor 320 in accordance with a threshold condition. The threshold condition can be preset, or set in accordance with a user-input. In some implementations, if the detector filter 315 determines the ambient noise level to be below a particular threshold, the output of the detector filter 315 controls the compressor or VGA 320 such that the gain of the pass-through signal flow path is substantially equal to unity. This in turn allows a user to hear ambient sounds substantially with little or no attenuation. In some implementations, if the detector filter determines the ambient noise level to be at or above the threshold, the output of the filter 315 can be configured to control the compressor or VGA 320 such that the overall gain of the pass-through signal path is less the unity, and the output of the ANR filter 305 provides attenuation of the noise at the ear. This allows the user to be aware of the environmental noise and sounds when the noise is below the threshold, yet take advantage of the ANR functionalities of the headset when the noise breaches a threshold—for example, to keep loud sounds such as from vehicles or sirens or machinery from getting uncomfortably loud.

While the example of FIG. 3A shows a VGA disposed in the pass-through signal path only, other variations are also possible. For example, a VGA may be disposed in the ANR path either in addition to or instead of the VGA 320 disposed in the pass-through signal path. In some implementations, a VGA disposed in a signal path (e.g., the ANR path or the pass-through path) can be controlled to adjust a weight associated with the corresponding path. For example, a VGA gain may be set substantially equal to zero to make the weight associated with the corresponding path substantially equal to zero. In some implementations, one or more additional parameters associated with a VGA (or the corresponding path in general) may be adjusted to control one or more characteristics of the corresponding path. For example, a response rate for the VGAs (which may also be referred to as compressor attack and release times corresponding to whether the compression is being ramped up or down, respectively) may be adjusted to provide either a rapid response or a relatively gradual response to changing noise level. In some implementations, this may dictate how quickly the ANR device adjusts the gains when the noise level satisfies the threshold condition, and/or how quickly the ANR device reduces or restores the gain to a predetermined level (e.g. unity) when the noise level no longer satisfies the threshold condition. In some implementations, the response rate can be adjusted such that the ANR processing responds to an increase in noise level smoothly based on a target attack rate. In some implementations, the target attack rate can be less than 100 dB/sec.

In some implementations, the outputs of the ANR path and the pass-through path are combined (e.g., in a weighted combination) to generate a feedforward signal 325 that drives, at least in part, the acoustic transducer 106. In some implementations, the feedforward signal 325 may be combined with a feedback signal 330 and/or one or more other signals 335. The signals 335 can include, for example, media signals originating from an audio input 108 or signals from one or more other microphones or audio sources.

Figure 3B:
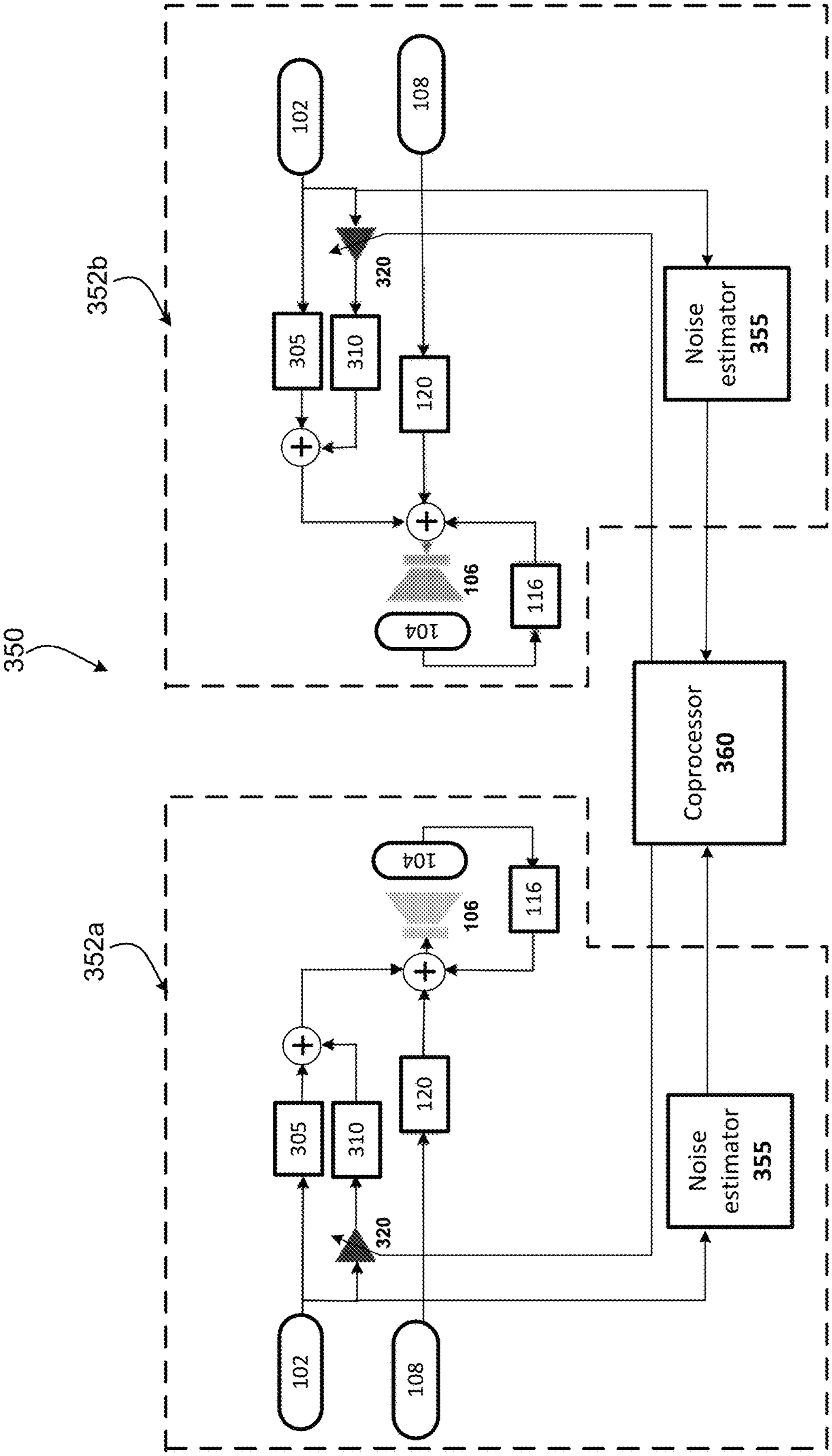
FIG. 3B is a block diagram of an example implementation of a binaural ANR system where a variable gain of the pass-through path disposed in parallel to the ANR path for each ear is controlled by a coprocessor based on estimates of noise-levels at both ears.

In some implementations, the gain control of the VGA or compressor 320 in each of the two separate earbuds or earcups can be coordinated, for example, to avoid having substantially unequal noise reduction in two earbuds/earcups of a headphone. FIG. 3B is a block diagram of an example implementation of such a binaural ANR system 350 where a variable gain of the pass-through path disposed in parallel to the ANR path for each ear is controlled based on estimates of noise-levels at both ears. Specifically, the implementation shown in FIG. 3B includes a coprocessor 360, which receives inputs from noise estimator modules 355 disposed in each of the two earbuds or earcups 352*a* and 352*b* (352, in general), and coordinates the gain control of the corresponding VGAs or compressors 320 in the two earbuds or earcups 352. In some implementations, the coprocessor 360 is disposed in one of the earbuds or earcups 352. In some implementations, the coprocessor 360 can be disposed in a device external to the headphone, such as in a device that is the source of the acoustic media being played through the headphone. The coprocessor can include one or more processing devices configured to analyze inputs received from the noise estimators 355, and generate gain control signals for the VGAs 320.

In some implementations, the noise estimator 355 comprises one or more digital filters configured to generate a signal that provides an estimate of the noise at the location of the corresponding earbud or earcup 352. For example, the noise estimator 355 can include a front-end weighting filter that emphasizes the portion of the spectrum most indicative on how loud a sound is perceived. In some implementations, the front-end weighting filter's response approximates A-weighting divided by a head-related transfer function (HRTF) (or another function representing the effect due to the presence/orientation of a user's head) to refer the noise signal as measured at the headphone's at-ear microphones to the diffuse field. Other front-end weighting filters are possible such as B- or C-weighting or a more sophisticated loudness model could be used. In some implementations, the front-end weighting filter can be used to compensate for hardware effects (e.g., microphone sensitivity). In some implementations, the front-end weighting filter can include multiple cascaded filters each of which accounts/compensates for a separate effect (e.g., an effect due to the presence/orientation of the head, an effect due to hardware, and/or A-weighting). The output of the weighting filter can be an AC signal that represents the relative loudness perceived at the corresponding ear. Such output can then be post-processed (e.g., by rectification and then low pass filtering) before being provided to the coprocessor 360 as an estimate of the noise-level at the corresponding ear.

Figure 3C:
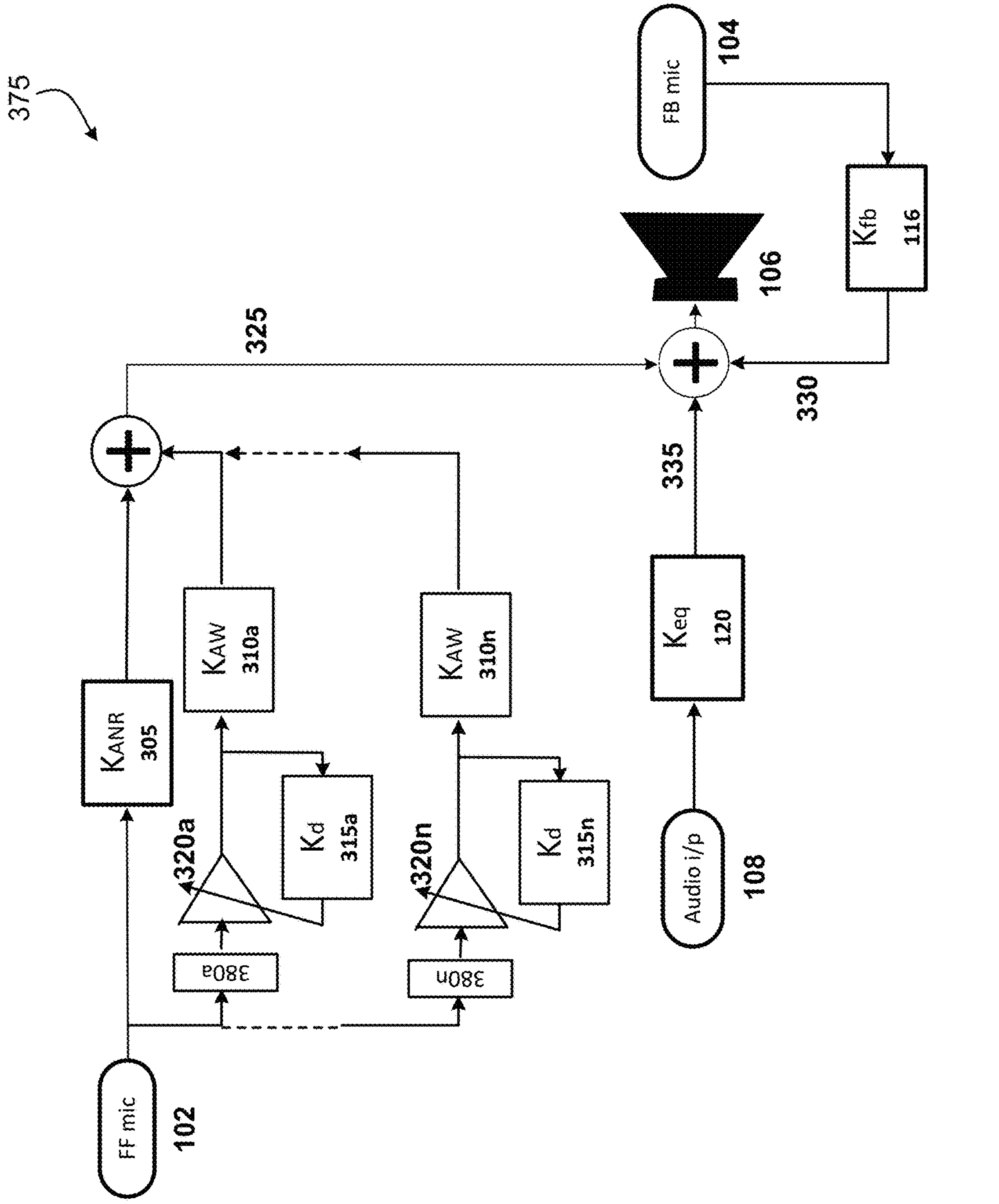
FIG. 3C is a block diagram of an example implementation of an ANR device where multiple variable pass-through paths are disposed in parallel to an ANR path in a feedforward signal flow path.

In some implementations, the systems depicted in FIGS. 3A and 3B can be implemented as a part of a multi-band system with two or more parallel paths, each with its own VGA 320 and pass-through filter $K_{AW}$ 310, all disposed in parallel to $K_{ANR}$ 305. An example of such a device is depicted in FIG. 3C, which shows a multi-band version of the device of FIG. 3A. Specifically, FIG. 3C is a block diagram of an example implementation of an ANR device 375 where multiple variable pass-through paths are disposed in parallel to an ANR path in a feedforward signal flow path. Each path includes a corresponding pass-through filter (one of: 310*a*, . . . , and 310*n*, 310 in general), a corresponding detector filter (one of: 315*a*, . . . , and 315*n*, 315 in general), and a corresponding VGA (one of: 320*a*, . . . , and 320*n*, 320 in general). Each pass-through filter 310 passes a different portion of the desired pass-through spectrum (as filtered using a corresponding bandpass filter—one of: 380*a*, . . . , and 380*n*) such that, when all VGAs 320 have unity gain, the overall desired 'aware' response is achieved. In some implementations, various parameters of the different parallel paths can be configured separately. For example, a particular parallel path can be configured to have its own attack and release rate, compression ratio, and/or threshold that is appropriate for the corresponding frequency band. In some implementations, one or more parameters, e.g., the thresholds and compression ratios, can be common across multiple parallel paths, while the corresponding attack and release rates can be different. This can allow for frequency-specific tuning of the response of the ANR device. For example, a device can be configured to have a fast response to high-frequency noise spikes, but a relatively slower response to low frequency noise. In some implementations, the parameters of the different paths can be made user-adjustable.

Figure 4A:
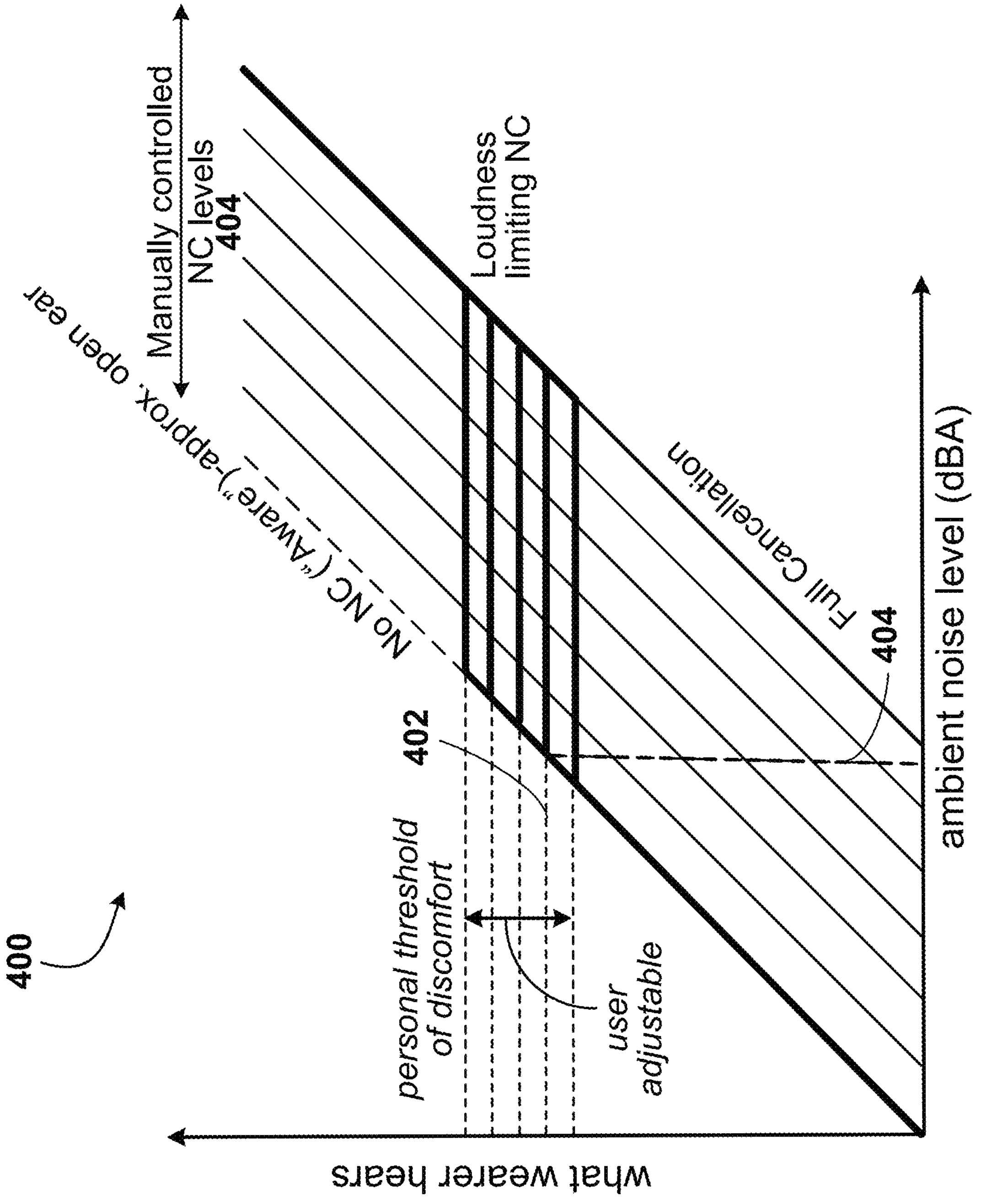
FIGS. 4A-4C are plots illustrating some example variations in ANR processing based on selected or determined threshold conditions.
Figure 4B:
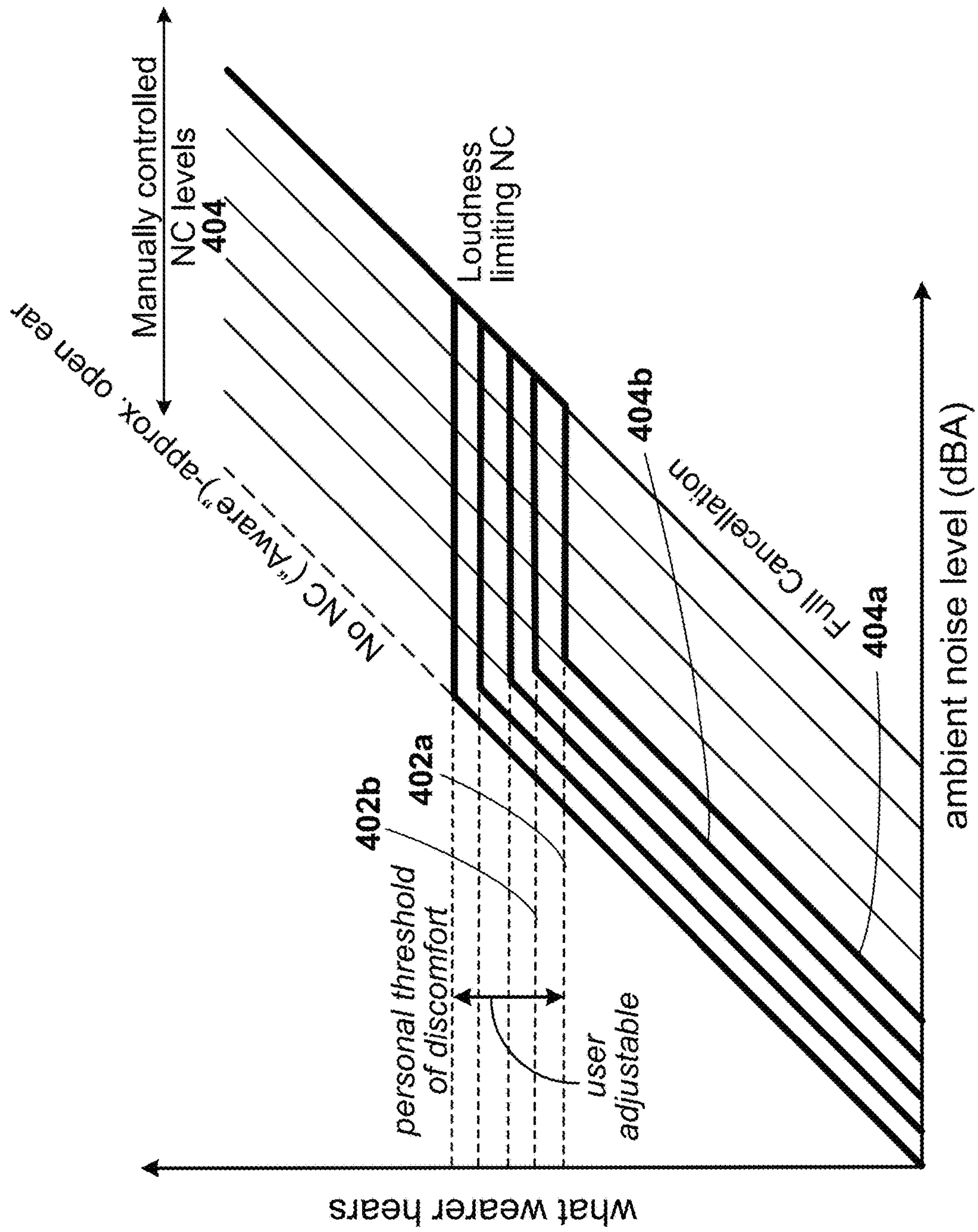
Figure 4C:
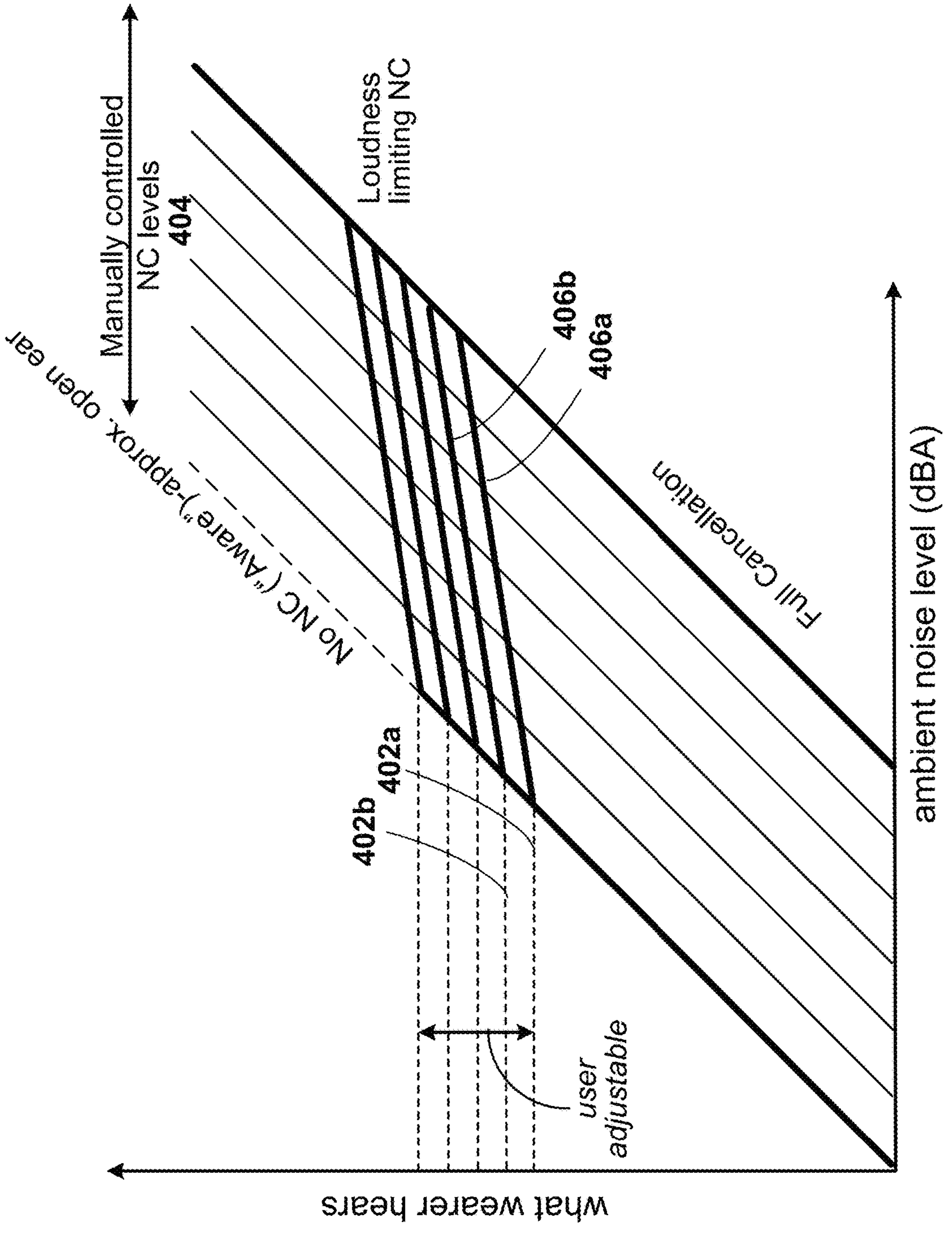

In some implementations, the components of the feedforward signal path 110 may be adjusted in various ways to generate the feedforward signal 325. FIGS. 4A-4C are plots illustrating some example variations in the ANR processing in the feedforward signal path 110 based on different threshold conditions. Specifically, FIG. 4A shows a plot 400 that illustrates implementations where the feedforward path 110 is adjusted to limit the signal 325 to a predetermined level when the ambient noise exceeds a threshold. For example, in one particular setting, the ANR path and/or the pass-through path may be adjusted such that below a noise level represented by the line 404, the amount of ANR processing is substantially zero (and/or the gain of the pass-through path is substantially equal to unity—to substantially represent an "open ear" condition). When the noise level is higher than the noise level represented by the line 404, the ANR processing (and/or the pass-through processing) may be adjusted such that the level of the feedforward signal 325 is substantially limited to the level 402. This can include reducing the gain associated with the pass-through path and/or increasing the degree of ANR processing (as represented by the series of lines 404) until the maximum possible degree of ANR processing is reached. In some implementations the threshold level 402 is a fixed predetermined amount for a particular ANR device. In some implementations, the threshold level 402 can be made adjustable, for example based on a user input, in accordance with a personal threshold of discomfort associated with loudness level. In some implementations, the threshold level can be set (or made user-adjustable) up to 80 dB(A) sound pressure level (SPL), though other values may be used. In the examples discussed herein, the levels associated with the thresholds and/or the ANR processing are defined in terms of the level heard by the user relative to the level of noise. Other definitions of the levels may also be used.

FIG. 4A represents situations where the degree of ANR processing is set to be substantially equal to zero when the noise level is below the threshold 402. Other variations are also possible. In some implementations, as shown in FIG. 4B, the degree of ANR processing 404 can be configured to be dependent on the threshold level 402. For example, for the threshold 402*a*, the degree of ANR processing below the threshold can be set to a level represented by the line 404*a*. When the threshold is increased to 402*b*, the degree of ANR processing may be reduced to a level represented by the line 404*b*, for example to account for a higher tolerance to ambient noise. In some implementations, the degree of ANR processing may be gradually decreased with increasing threshold levels until the ANR processing is substantially turned off to represent the substantially "open ear" condition.

In each of the examples depicted in FIGS. 4A and 4B, the output loudness is adjusted to be substantially limited to the threshold level 402. In these examples, the feedforward path 110 acts as a limiter. In some implementations, the feedforward path may be configured to act as a compressor where the output loudness is compressed, for example, in accordance with a compression ratio that may or may not depend on the threshold level. Examples of such implementations are illustrated in FIG. 4C. In one example, if the threshold is set at level 402*a*, the feedforward path 110 is adjusted such that the output loudness is adjusted in accordance with the curve 406*a* once the noise level exceeds the threshold 402*a*. In another example, if the threshold is set at level 402*b*, the feedforward path 110 is adjusted such that the output loudness is adjusted in accordance with the curve 406*b* once the noise level exceeds the threshold 402*b*. While FIG. 4C shows the slope of the curve 406*a* to be approximately equal to that of the curve 406*b*, and shows a substantially constant slope, other variations are also possible. For example, the compression ratio (as represented, for example, by the slope of the curves 406) can be configured to vary in accordance with the threshold (e.g., with a higher threshold allowing for a less aggressive compression). The slope may also vary within a curve, for example, a gentle slope could be used for a first range of ambient noise levels while a more aggressive slope could be used for a second range of ambient noise levels, and yet in other ranges the slope could be substantially flat. In some implementations, a compression ratio can be such that for every 10 dB increase in noise level, the attenuation increases by at least 5 dB.

The examples shown in FIGS. 4A-4C are for illustrative purposes, and do not represent exclusive ways in which the subject technology may be implemented. Other variations are within the scope of this disclosure. In some implementations, the output loudness may be adjusted in coordination between the corresponding circuitry for the left and right ears. For example, the output loudness may be adjusted differently for one ear with respect to the other. In some implementations, the circuitry can include one or more voice activity detectors, and the output loudness of the left and/or right transducers may be adjusted responsive to detection of voice activity. For example, the one or more voice activity detectors can be configured to detect the voice of the wearer of the headphone, and reduce a level of attenuation or noise reduction in response to that. In some cases, this can lead to an improved user experience by "opening up" the headphone when the wearer is in conversation with another person. For example, the wearer can participate in such a conversation without having to take off the headphone or manually reducing the noise reduction/attenuation. In some implementations, separate voice activity detectors may control the circuitry corresponding to the two ears, and the output loudness may be controlled in accordance with the direction from which voice activity is detected. In some implementations, the rate of change in output loudness with respect to ambient noise level can be configured to depend on an amount of deviation from the threshold. For example, the rate of change in output loudness with respect to ambient noise level can be configured to be non-linear (or piecewise linear with varying degree of linearity) depending on the amount of deviation from the threshold.

Figure 5A:
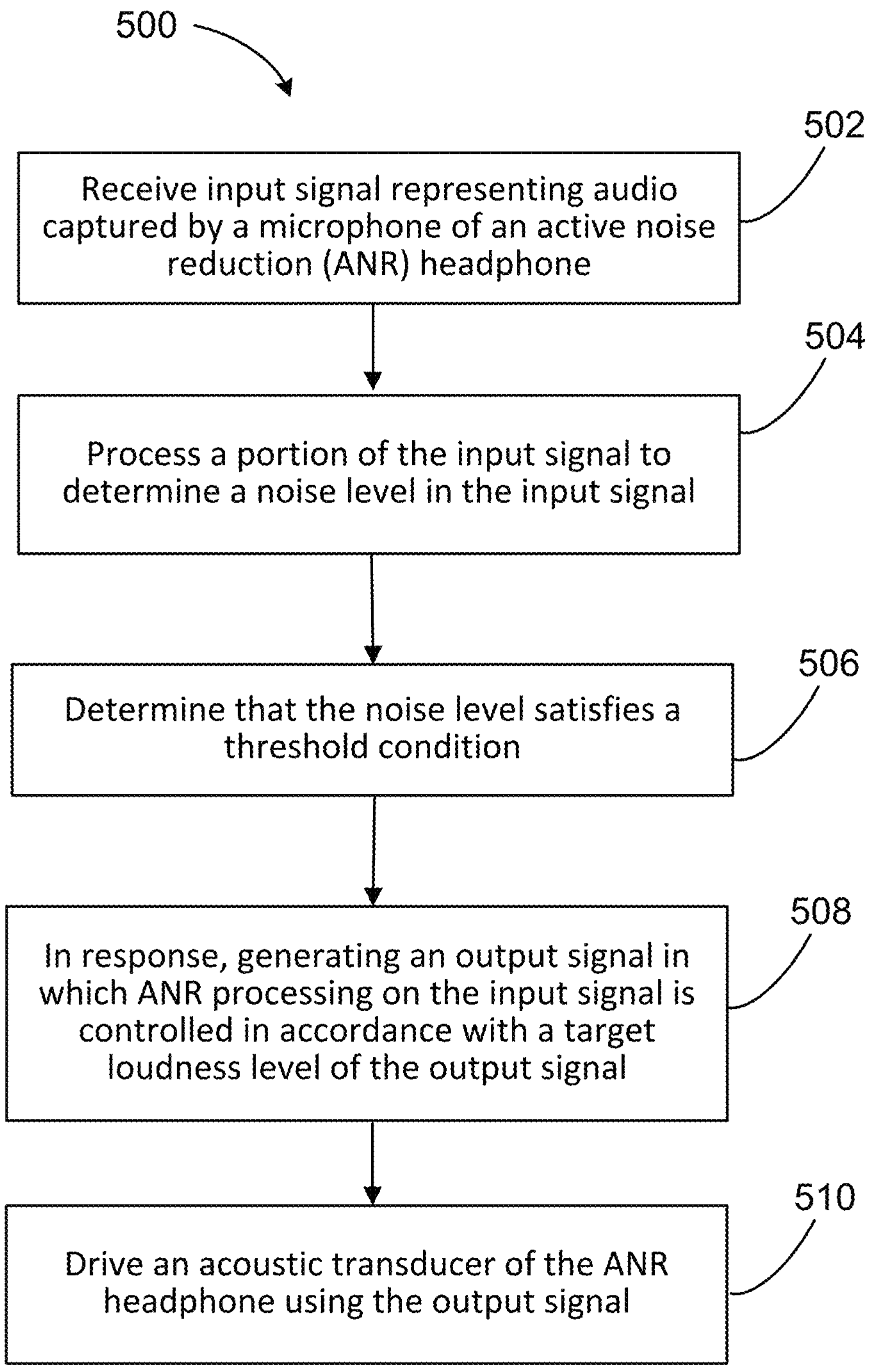
FIG. 5A is a flowchart of an example process for generating an output signal in an ANR device that includes an ANR signal flow path and a variable pass-through signal flow path disposed in parallel.

FIG. 5A is a flowchart of an example process 500 for generating an output signal in an ANR device in accordance with the technology described herein. At least a portion of the process 500 can be implemented using one or more processing devices such as DSPs described in U.S. Pat. Nos. 8,073,150 and 8,073,151, incorporated herein by reference in their entirety. In some implementations, the process 500 can be implemented in a device that includes signal paths substantially similar to those depicted in FIG. 3A and FIG. 3B. Operations of the process 500 include receiving an input signal representing audio captured by a microphone of an ANR headphone (502). In some implementations, the input signal can be captured using a feedforward microphone (or another microphone) configured to capture ambient noise. In some implementations, the input signal may be pre-processed such that subsequent processing in the device is based on components within a particular range of frequencies. For example, the input signal can be weighted using a target frequency response to adjust the spectral content of the input signal. In some implementations, the target frequency response can include A-weighting curves configured to account for a relative loudness perceived by the human ear, and filter out frequencies to which the human ear is less sensitive. The target frequency response can also be based on, for example, a head-related transfer function (HRTF) that characterizes how the human ear perceives sound from a particular direction.

Operations of the process 500 also include processing a portion of the input signal to determine a noise level in the input signal (504). In some implementations, the portion of input signal can include a band-limited signal within a target range of frequencies, or a signal that is otherwise obtained by preprocessing the input signal. In some implementations, the portion of the input signal that is processed can include frequencies that lie outside the range associated with human speech such that sounds that do not represent human speech are preferentially attenuated by the ANR device.

In some implementations, operations of the process 500 include determining that the noise level satisfies a threshold condition (506). In some implementations, the threshold condition can be determined based on a user-input. For example, the corresponding ANR device or headphone can be equipped with a control that allows a user to set the level of ambient noise that the user is comfortable with. In such cases, the threshold condition can be determined based on a target loudness level indicated by the user-input. In some implementations, the threshold condition may be preprogrammed into the corresponding device. In some implementations, the threshold condition may be adaptively determined based on contextual information. For example, if the user is in a quiet place such as a library (which may be determined based on, for example, location information from the user's mobile device), the threshold can be adaptively set to a relatively high value as compared to when the user is in a noisy environment (e.g., an airport).

In some implementations, operations of the process 500 include generating, in response to determining that the noise level satisfies a threshold condition, an output signal in which ANR processing on the input signal is controlled in accordance with a target loudness level of the output signal (508). In some implementations, determining that the noise level satisfies the threshold condition can include determining that the noise level is larger than a level associated with the threshold condition, and responsive to determining that the noise level is larger than the level associated with the threshold condition, controlling the ANR processing in accordance with the noise level. Controlling the ANR processing can be done in various ways, including, for example, the various techniques described with reference to FIGS. 4A-4C. For example, controlling the degree of ANR processing on the input signal can include adjusting an insertion gain in accordance with the threshold condition. In another example, controlling the degree of ANR processing on the input signal can include adjusting a compression of the input signal in accordance with the threshold condition. In some implementations, determining that the noise level satisfies the threshold condition can include determining that the noise level is less than a level associated with the threshold condition, and in response, controlling the ANR processing independently of the noise level. For example, if the noise level is less than the level associated with the threshold condition, the ANR processing can be set to a predetermined level irrespective of the noise level. In some implementations, the noise level in the input signal is determined as a signal-to-noise ratio (SNR) with respect to another signal also driving the acoustic transducer. The signal with respect to which the SNR is measured can include an audio input (e.g., the audio input 108 described with reference to FIG. 1), the signal from another microphone (e.g., the feedback microphone 104), or the signal from another audio source. In some implementations, the threshold condition can be selected from multiple threshold conditions, each of which corresponds to a different degree of ANR processing.

Operations of the process 500 also include driving an acoustic transducer of the ANR headphone using the output signal (510). This can include, for example, processing the input signal in a first signal path comprising one or more ANR filters to generate a first signal, processing the input signal in a second signal path that is disposed in parallel to the first signal path, to generate a second signal, and generating the output signal by combining the first signal and the second signal in a weighted combination. In some implementations, the first and second paths can be substantially similar to the ANR signal path and the pass-through path, respectively, as described with reference to FIG. 2. One or both of the first and second signal paths can include a VGA disposed to control the amplification/attenuation associated with the corresponding path. In some implementations, in one mode of operation of the ANR headphone, a weight associated with the first signal can be substantially equal to zero, which in turn may allow the second signal to dominate the output signal. Similarly, in another mode of operation, a weight associated with the second signal can be substantially equal to zero, thereby allowing the first signal to dominate the output signal.

Figure 5B:
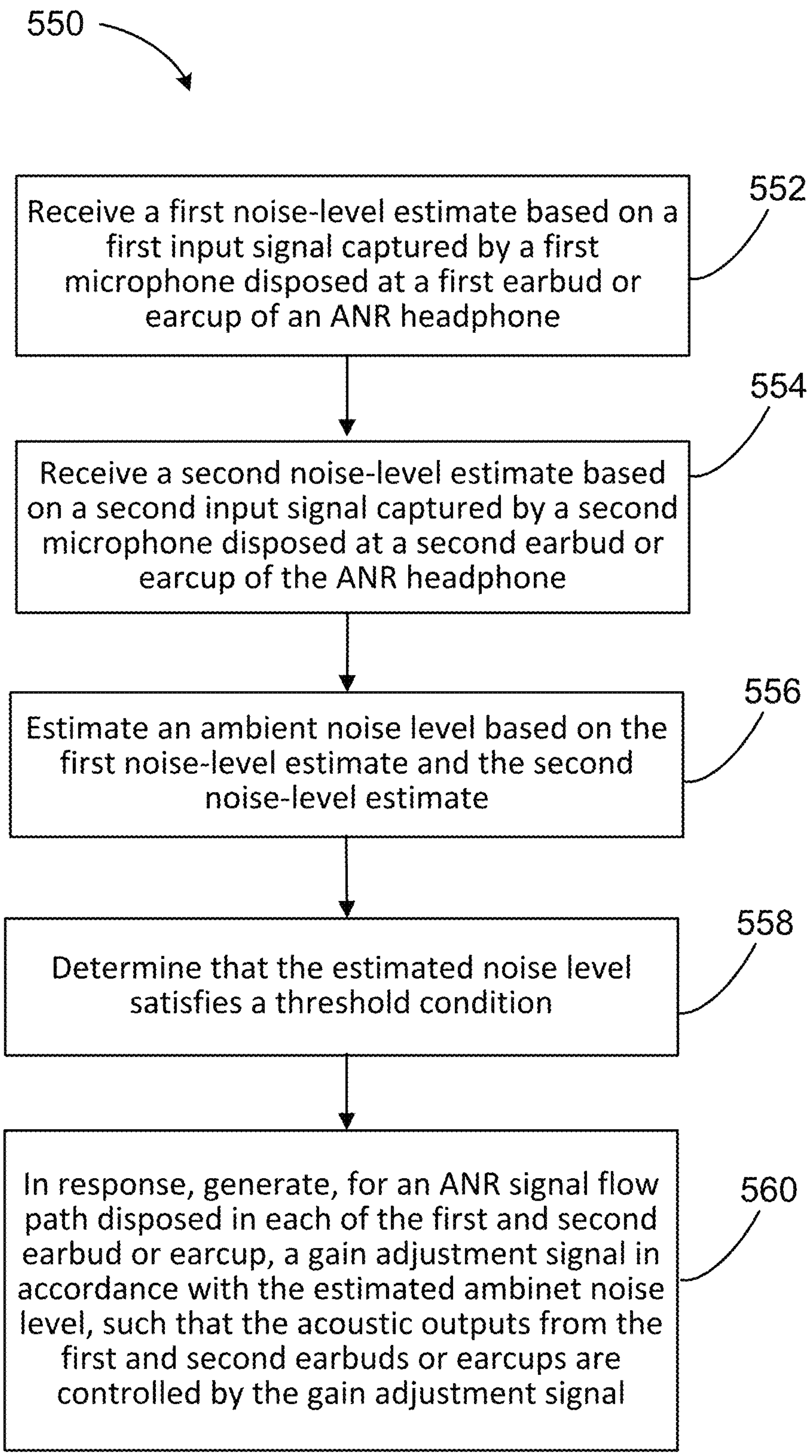
FIG. 5B is a flowchart of an example process for generating a gain adjustment signal for an ANR signal path in each of two earbuds or earcups of an ANR headphone.

FIG. 5B is a flowchart of an example process 550 for generating a gain adjustment signal for an ANR signal path in each of two earbuds or earcups of an ANR headphone. The process 550 can be implemented, for example, by one or more processing devices arranged to control the ANR signal paths disposed in earbuds/earcups of an ANR headphone. In some implementations, the process 500 may be executed by the coprocessor 360 described above with reference to FIG. 3B. Operations of the process 550 includes receiving a first noise-level estimate based on a first input signal captured by a first microphone disposed at a first earbud or earcup of an ANR headphone (552). For example, the first microphone can be a feedforward microphone of the first earbud or earcup. The operations of the process also includes receiving a second noise-level estimate based on a second input signal captured by a second microphone disposed at a second earbud or earcup of the ANR headphone (554). For example, the second microphone can be a feedforward microphone of the second earbud or earcup.

In some implementations, each of the first and second noise-level estimates can be generated by processing the input signal captured by the corresponding microphone by noise estimator similar to the noise estimator described above with reference to FIG. 3B. For example, each of the first and second noise-level estimates can be generated by processing the input signal via an A-weighting filter, or in one of the other methods described above with reference to FIG. 3B.

Operations of the process 550 also includes estimating an ambient noise level based on the first noise-level estimate and the second noise-level estimate (556). This can include, for example, computing a quantity that is a function of the first noise-level estimate and the second noise-level estimate. For example, estimating the ambient noise level can include determining, as a representative noise level of the environment, an average of the first noise-level estimate and the second noise-level estimate.

Operations of the process 550 further includes determining that the estimated noise level satisfies a threshold condition (558). In some implementations, the threshold condition may be determined based on a user-input, for example, as described above. For example, the threshold condition can be selected from multiple threshold conditions, each of which corresponds to a different degree of ANR processing preferred by the user.

Operations of the process 550 also includes generating, in response to determining that the estimated noise level satisfies a threshold condition, a gain adjustment signal in accordance with the estimated ambient noise level (560). The gain adjustment signal is generated for an ANR signal flow path disposed in each of the first and second earbud or earcup, such that acoustic outputs from the first and second earbuds or earcups are controlled by the gain adjustment signal. In some implementations, the acoustic output of each of the first earbud or earcup is generated in accordance with a compression process executed on the corresponding input signal. The compression process can be substantially similar to those described above with reference to FIG. 4C.

In some implementations, the gain adjustment signal is configured to control a variable gain amplifier (VGA) disposed in the corresponding ANR signal flow path. The ANR signal flow path can include a first signal path that includes the VGA, and a second signal path disposed in parallel to the first signal flow path. In some implementations, the ANR signal flow path is disposed in a feedforward signal path disposed between a feedforward microphone and an acoustic transducer of the corresponding earbud or earcup, as shown for example in FIG. 3B.

In some implementations, the output signal can be generated in accordance with a response rate associated with the ANR processing. In some implementations, the response rate can be adjusted by controlling the response time of a VGA associated with the signal pathway, for example, as described with reference to FIG. 3A. The response rate can be adjusted, for example, in accordance with a user-input that indicates whether the ANR processing should adjust aggressively, or relatively gradually, when the ambient noise changes. In some implementations, the response rate is set at or above a predetermined value (e.g., based on a target attack/decay rate) to allow the system to respond to steady-state noise rather than to noise spikes.

In some implementations, a response rate associated with the ramp-up of a VGA response can be different from a response rate associated with a ramp-down of a VGA response. These may be represented by two different time constants that may be referred to as the attack time constant and release time constant, respectively. In some implementations, a higher attack time constant can represent a more gradual onset of the noise-cancellation functionality, while a higher release time constant can represent a more gradual onset of the hear-through functionality. In some implementations, the attack time constant may be different from the release time constant. In some implementations, the attack and release time constants may be substantially equal to one another. In some implementations, the attack time constant may be at least one second.

In some implementations, the technology described in this document may be combined with other types and forms of ANR technology, including for example, user-adjustable levels of ANR. In some implementations, one or more controls can be provided (e.g., in the form of physical switches on the device, or a user interface displayed on a smartphone paired to the device) to allow a user to enable/disable the available functionalities as needed. For example, in a headphone with controllable ANR, a loudness limiting feature could be disabled by a user when the user prefers full noise cancellation. In another example, such as when the user is walking through a city, the loudness limiting noise cancellation feature may be enabled to achieve a balance between awareness and comfort. In some implementations, the loudness limiting feature could be automatically enabled or disabled, for example, based on contextual information such as location or ambient noise level. For example, in environments where full noise cancellation is deemed to be preferred by the user, loudness limiting ANR may be automatically disabled. In another example, responsive to detecting that the user is out for a run or walk, loudness limiting ANR may be automatically enabled for a balance between awareness and comfort.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media or storage device, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

Figure 6:
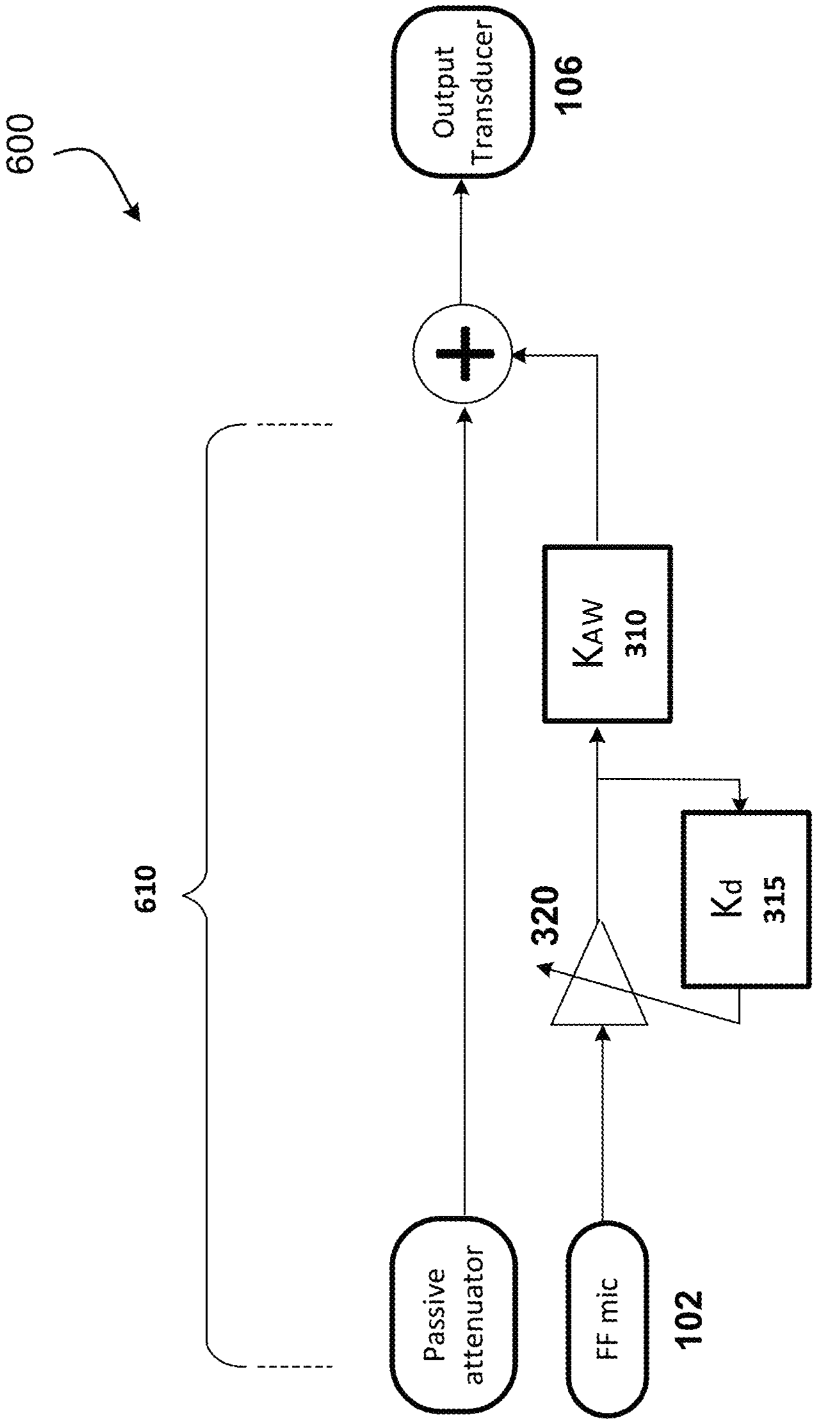
FIG. 6 is a block diagram of an example implementation of a passive attenuation device where a variable pass-through path is disposed in parallel to the passive attenuation path.

Other embodiments and applications not specifically described herein are also within the scope of the following claims. For example, while the technology is described in this document primarily with respect to ANR devices, other types of devices may also be within the scope of the disclosure. For example, if a device employs passive attenuation, level dependent ANR functionality in accordance with the technology described herein may be added in parallel to the passive attenuation path to improve the performance of such a device. An example of such a device 600 is depicted in FIG. 6. The device 600 includes a passive attenuation path 610 that includes a passive attenuator blocking sounds from reaching the output transducer 106. However, in some cases, it may be desirable to bypass the passive attenuation path 610, for example to allow for ambient noise to pass through. In such cases, a variable pass-through path—which may be substantially identical to the variable pass-through path described above with reference to FIGS. 3A and 3B—can be disposed in parallel to the passive attenuation path, as shown in FIG. 6.

Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:

1. A method comprising:

receiving, at one or more processing devices, a first noise-level estimate, the first noise-level estimate being based on a first input signal captured by a first microphone disposed at a first earbud or earcup of an active noise reduction (ANR) headphone;

receiving, at the one or more processing devices, a second noise-level estimate, the second noise-level estimate being based on a second input signal captured by a second microphone disposed at a second earbud or earcup of the ANR headphone;

estimating an ambient noise level based on the first noise-level estimate and the second noise-level estimate, the estimated ambient noise level being indicative of a loudness of the ambient noise level perceivable by a user;

determining that the estimated ambient noise level exceeds a threshold level; and responsive to determining that the estimated ambient noise level exceeds the threshold level, generating, for an ANR signal flow path disposed in each of the first and second earbud or earcup, a gain adjustment signal in accordance with the estimated ambient noise level, such that (i) acoustic outputs from the first and second earbuds or earcups are controlled by the gain adjustment signal and (ii) a degree of ANR processing is controlled by the gain adjustment signal so that an output sound level perceivable by the user increases with an increase in the estimated ambient noise level.

2. The method of claim 1, wherein the threshold level is determined based on a user-input.

3. The method of claim 1, wherein a gain level of the acoustic output from the first earbud or earcup is substantially equal to a gain level of the acoustic output from the second earbud or earcup.

4. The method of claim 1, wherein estimating the ambient noise level based on the first noise-level estimate and the second noise-level estimate comprises determining an average of the first noise-level estimate and the second noise-level estimate.

5. The method of claim 1, wherein each of the first and second noise-level estimates are generated by processing the input signal captured by the corresponding microphone by an A-weighting filter.

6. The method of claim 1, wherein the gain adjustment signal is configured to control a variable gain amplifier (VGA) disposed in the corresponding ANR signal flow path.

7. The method of claim 6, wherein the ANR signal flow path comprises a first signal path that includes the VGA, and a second signal path disposed in parallel to the first signal flow path.

8. The method of claim 1, wherein the ANR signal flow path is disposed in a feedforward signal path disposed between a feedforward microphone and an acoustic transducer of the corresponding earbud or earcup.

9. The method of claim 1, wherein the threshold level is selected from multiple threshold levels, each of which corresponds to a different degree of ANR processing.

10. The method of claim 1, wherein the acoustic output of each of the first and second earbud or earcup is generated in accordance with a compression process executed on the corresponding input signal.

11. The method of claim 1, wherein the gain adjustment signal is generated in accordance with the estimated ambient noise level such that a compression ratio associated with the output sound level perceivable by the user is dependent on the threshold level.

12. The method of claim 1, wherein the gain adjustment signal is generated in accordance with the estimated ambient noise level such that a compression ratio associated with the output sound level perceivable by the user varies with the estimated ambient noise level.

13. An apparatus comprising:

a noise reduction headphone that includes:
 a first earbud or earcup, and
 a second earbud or earcup;

a controller comprising one or more processing devices, the controller configured
 receive a first noise-level estimate, the first noise-level estimate being based on a first input signal captured by a first microphone disposed at the first earbud or earcup,
 receive a second noise-level estimate, the second noise-level estimate being based on a second input signal captured by a second microphone disposed at a second earbud or earcup,
 estimate an ambient noise level based on the first noise-level estimate and the second noise-level estimate, the estimated ambient noise level being indicative of a loudness of the ambient noise level perceivable by a user,
 determine that the estimated ambient noise level exceeds a threshold level, and
 responsive to determining that the noise level exceeds the threshold level, generate for an ANR signal flow path disposed in each of the first and second earbud or earcup, a gain adjustment signal in accordance with the estimated ambient noise level, such that (i) acoustic outputs from the first and second earbuds or earcups are controlled by the gain adjustment signal and (ii) a degree of ANR processing is controlled by the gain adjustment signal so that an output sound level perceivable by the user increases with an increase in the estimated ambient noise level; and an acoustic transducer in each of the first and second earbud or earcup, the acoustic transducer configured to generate the corresponding acoustic output.

14. The apparatus of claim 13, wherein the noise reduction headphone is an active noise reduction (ANR) headphone.

15. The apparatus of claim 13, wherein the threshold level is determined based on a user-input.

16. The apparatus of claim 13, wherein a gain level of the acoustic output from the first earbud or earcup is substantially equal to a gain level of the acoustic output from the second earbud or earcup.

17. The apparatus of claim 13, wherein estimating the ambient noise level based on the first noise-level estimate and the second noise-level estimate comprises determining an average of the first noise-level estimate and the second noise-level estimate.

18. The apparatus of claim 13, wherein each of the first and second earbud or earcup further comprises an A-weighting filter configured to generate, from the corresponding input signal, the first and second noise-level estimate, respectively.

19. The apparatus of claim 13, wherein the corresponding ANR signal flow path in each of the first and second earbud or earcup comprises a variable gain amplifier (VGA) that is controlled by the gain adjustment signal.

20. The apparatus of claim 19, wherein each of the corresponding ANR signal flow paths comprises a first signal path that includes the VGA, and a second signal path disposed in parallel to the first signal flow path.

21. The apparatus of claim 13, wherein the ANR signal flow path disposed in each of the first and second earbud or earcup is a feedforward signal path.

22. One or more machine-readable storage devices having encoded thereon computer readable instructions for causing one or more processing devices to perform operations comprising:

receiving a first noise-level estimate, the first noise-level estimate being based on a first input signal captured by a first microphone disposed at a first earbud or earcup of an active noise reduction (ANR) headphone;

receiving a second noise-level estimate, the second noise-level estimate being based on a second input signal captured by a second microphone disposed at a second earbud or earcup of the ANR headphone;

estimating an ambient noise level based on the first noise-level estimate and the second noise-level estimate, the estimated ambient noise level being indicative of a loudness of the ambient noise level perceivable by a user;

determining that the estimated ambient noise level exceeds a threshold level; and responsive to determining that the estimated ambient noise level exceeds the threshold level, generating, for an ANR signal flow path disposed in each of the first and second earbud or earcup, a gain adjustment signal in accordance with the estimated ambient noise level, such that (i) acoustic outputs from the first and second earbuds or earcups are controlled by the gain adjustment signal and (ii) a degree of ANR processing is controlled by the gain adjustment signal so that an output sound level perceivable by the user increases with an increase in the estimated ambient noise level.

* * * * *